United States Patent [19]
Mecca

[11] Patent Number: 4,793,572
[45] Date of Patent: Dec. 27, 1988

[54] VERTICAL LAUNCH AND HOVERING SPACE SHUTTLE

[76] Inventor: John Mecca, 110 Whittier Dr., San Remo, N.Y. 11754

[21] Appl. No.: 909,846

[22] Filed: Sep. 17, 1986

Related U.S. Application Data

[63] Continuation of Ser. No. 826,810, Feb. 6, 1986, abandoned.

[51] Int. Cl.⁴ ............................................. B64C 27/24
[52] U.S. Cl. ................................... 244/7 R; 244/7 A
[58] Field of Search ............... 244/7 A, 7 R, 6, 17.11

[56] References Cited

U.S. PATENT DOCUMENTS

| | | | |
|---|---|---|---|
| 2,249,026 | 7/1941 | Mourning et al. | 244/7 A |
| 2,518,008 | 8/1950 | Herrick | 244/7 A |
| 3,884,431 | 5/1975 | Burrell | 244/7 A |

FOREIGN PATENT DOCUMENTS

| | | | |
|---|---|---|---|
| 480830 | 5/1953 | Italy | 244/7 R |

Primary Examiner—Galen L. Barefoot
Assistant Examiner—Rodney Corl
Attorney, Agent, or Firm—Leonard Belkin

[57] ABSTRACT

The invention concerns the forming of vertical thrust by rotor blades and their subsequent stopping to act as wings, by changing the angle of of attack of the individual stationary blades during foward flight. The horizontal movement of each blade is independent from one another around the perimeter of the central rotor axis hub, and the opposing diagonal set's move up against each other and interconnect to become an integrated single wing from the two separate blades. A common pivot is utilized across the intersecting edges of the blades comprising the singular wing to have this common pivot hinge between them to allow changes in pitch of the leading and trailing parts of the wing. Such joined blades acting as wings are able to move together to accomplish a variable swing wing movement that would include swept foward and back configurations and infinite changes of their attitude between those two extreme positions.

4 Claims, 8 Drawing Sheets

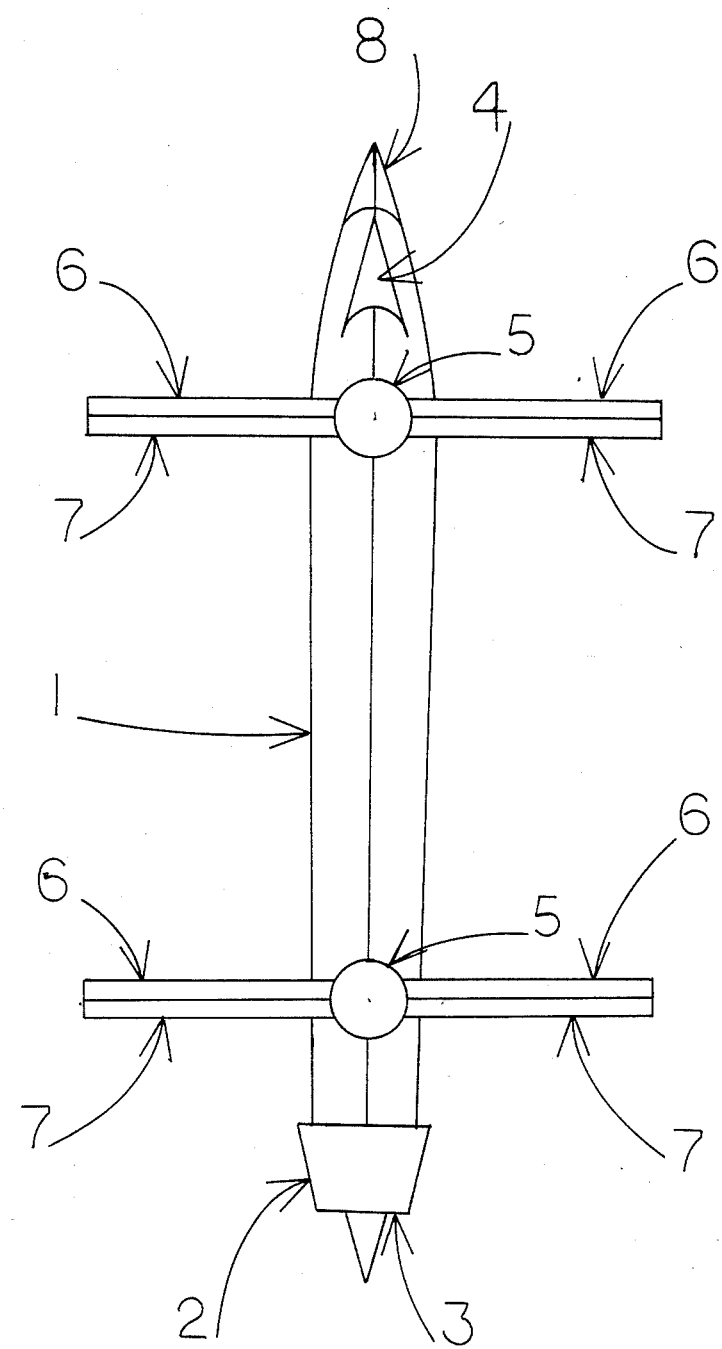

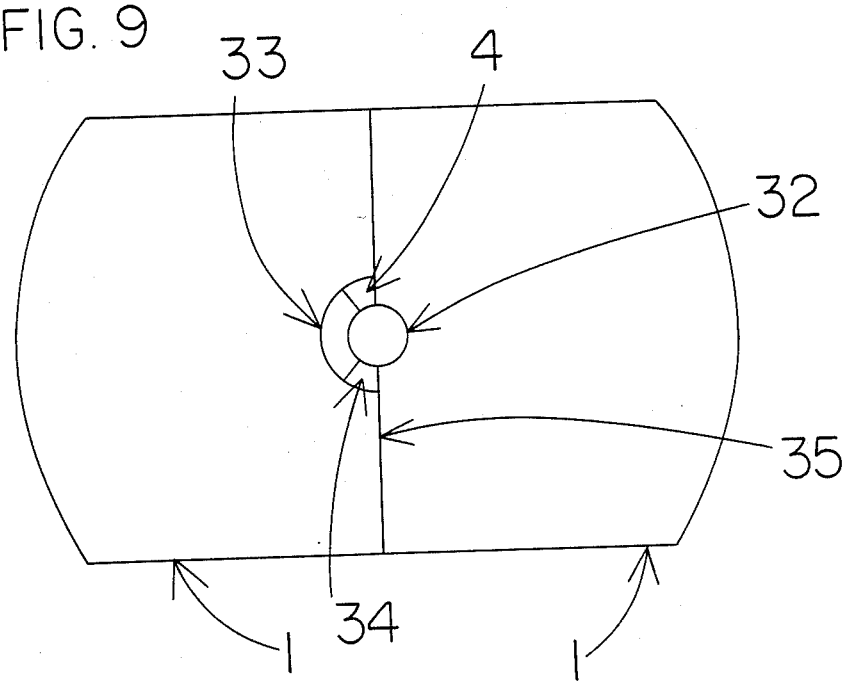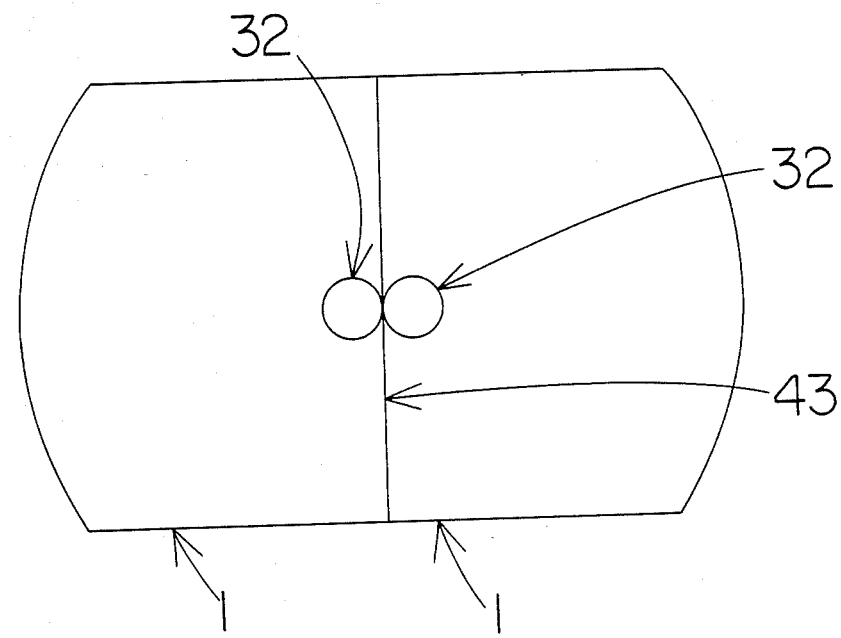

VERTICAL LAUNCH AND HOVERING SPACE SHUTTLE

This is a continuation of Ser. No. 826,810 filed 2-6-86, now abandoned.

BACKGROUND OF THE INVENTION

Field of the invention relates to the vertical takeoff, and horizontal takeoff, along with hovering within the atmosphere. Hypersonic configuration changes in mid flight to reduce drag, while providing lift and control utilizing the same surfaces.

Through the use of multiple lifting body surfaces producing vertical thrust from their rotation, and at appropriate phases convert into a stationary wing system that is the air control, lift, and stabilizer during foward flight.

PRIOR ART

With the increased need to eliminate specially prepared landing areas, raise payloads vertically, eliminate the need for booster assist expendable thrust charges, transatmospheric flights safety depend on the simplicity of the mono stage vehicular independence.

The typical devices previously used to produce vertical takeoffs direct thrust downwards, forcing the vehicle upwards and consuming large amounts of fuel compared to when the the vehicle is at its cruise speed.

The present invention substantially resolves this problem to give vehicle impetus to move from a standstill off the ground to cruise speeds.

The vertical takeoff transatmospheric shuttle mono stage craft consists of a cargo storage container in the shape of a cylinder, the nose of the cylinder has an aerodynamically streamlined heat resistant conical shape. At the rear of the cylinder are appropriate thrust producing mechanisms to initiate foward motion; the craft has a pointed cylinder which lays on its side upon retractable landing gear, one or more spinning rotor sets radiate perpendicularily from their common vertical axis, not unlike a helicopter main rotor spinning to cause vertical lift of the vehicle. After the appropriate altitude and foward speed is achieved with the use of the spinning rotors downward thrust, the rotors would rapidly stop spinning and the individual blades would move up against its diagonal opposite and form two wings from the four individual blades attached to each rotor axis. Upon the integration of blade to blade forming of wings, the individual blades alter their pitch to assume an appropriate angle of attack into oncomming air stream to lift as wings in unision.

SUMMARY OF THE INVENTION

The present invention is comprised of a main vertical thrust rotating airfoil blades to initially spin to lift the vehicle and then freeze to become stationary wings, these wings are capable of independent movement from swept foward position to swept back positions.

It is therefore an object of the present invention to provide vertical takeoff thrust.

It is another object to stop the spinning rotors in mid flight and utilize them for wing surfaces.

It is another object to eliminate the complexities of ducting the thrust.

It is another object to save fuel moving straight up from a standstill with rotor blades, compared to using rocket boosters.

It is another object to eliminate first and second stage boosters.

It is another object to have vertical thrust rotors stationary to eliminate wear of moving parts during the majority of the duration of the foward flight length.

It is another object to provide alteration of the stationary wing configuration, in that the wings can move independently of each other.

It is another object to create a wing surface from two seperated wing surfaces.

It is another object to increase the strenght of the wing through the joining of the two blades into one wing.

BRIEF DESCRIPTION OF THE DRAWINGS

FIG. (I) Shows an overview of the vehicle with the rotors stationary and assuming the swept back wing mode predominantly used in high speed flight.

FIG. (2) Shows an overview with the rotor blades in position relative to each other for the purpose of spinning to create lift; this position of the blades is also the position assumed upon their rapid stop in mid flight.

FIG. (3) Shows an overview of the rotor blade position assumed immediately after stopping in mid flight, the four separate blades have paired up to form two wings opposing each other, this particular position is conducive to maximum lift at low foward speed presenting its wing lengths at right angles to the foward motion of the vehicle.

FIGS. 4A through 4E show possible wing configurations using the independently movable wings; these configurations show only some of the positions possible, the variations are infinite due to their independece from each other.

Figure 5A:
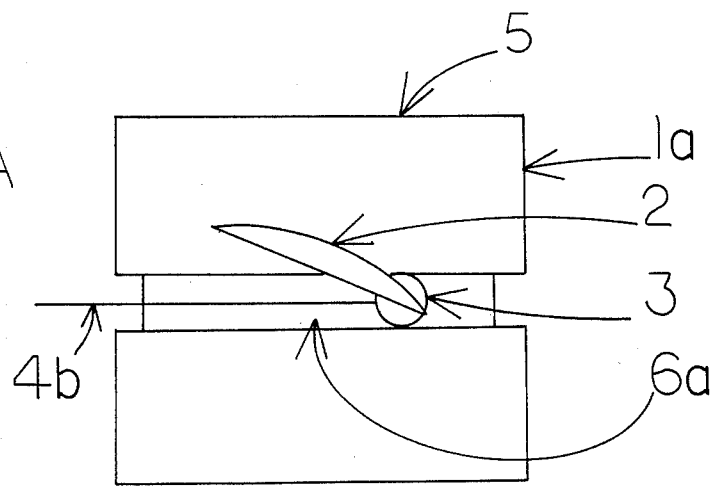
Figure 5B:
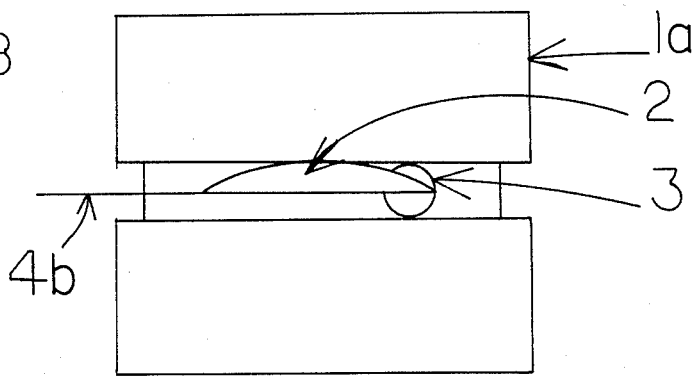
Figure 5C:
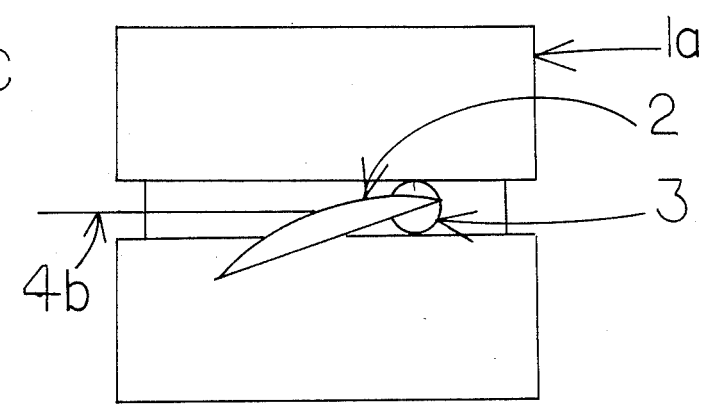
Figure 6A:
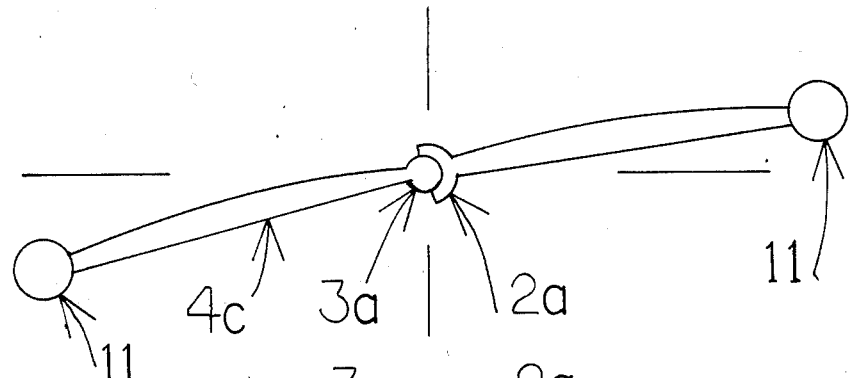
Figure 6B:
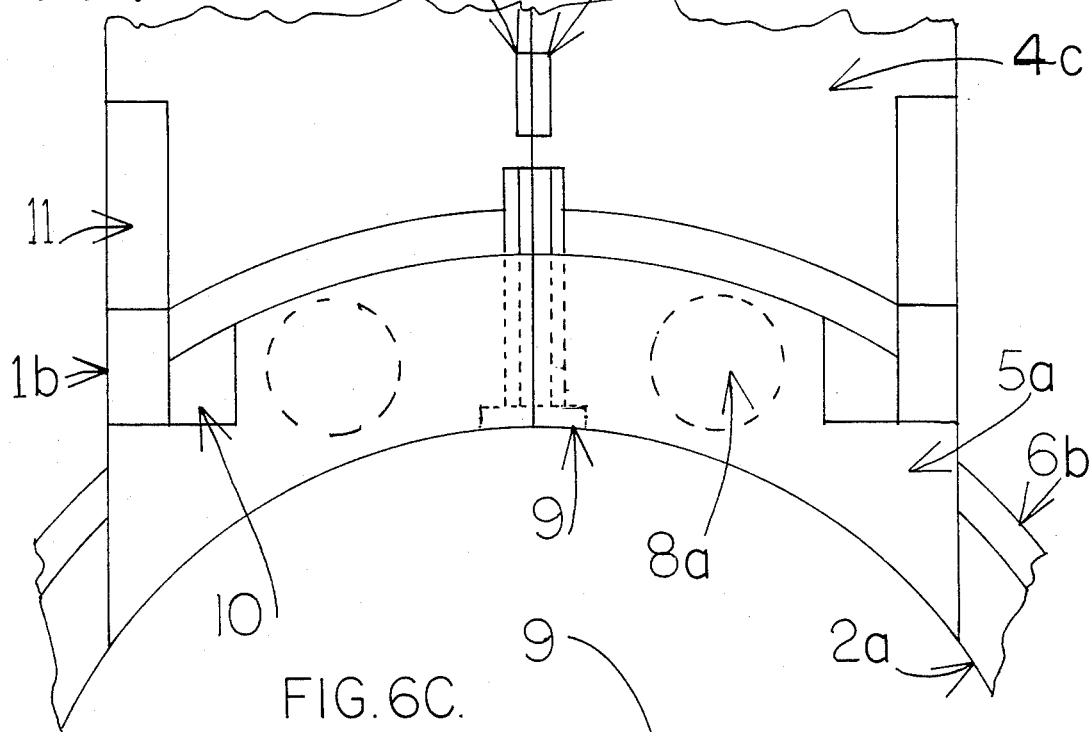
Figure 6C:
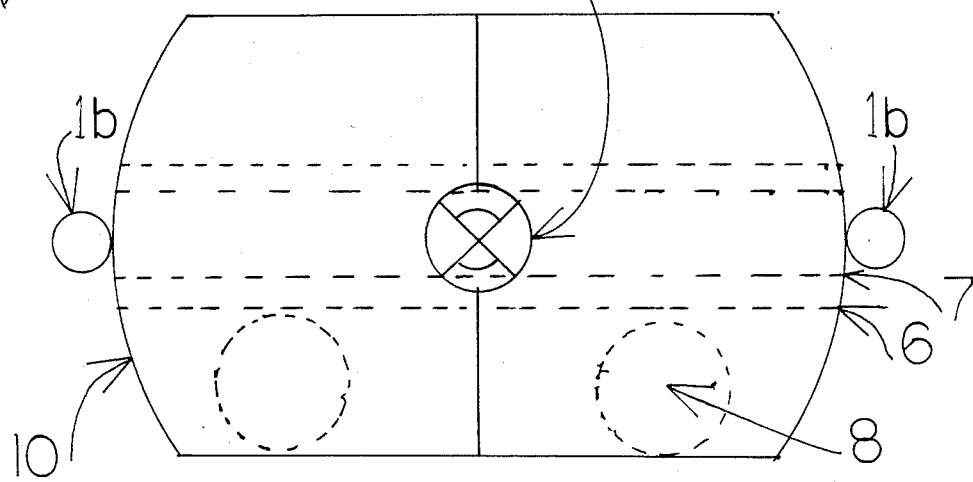
Figure 7:
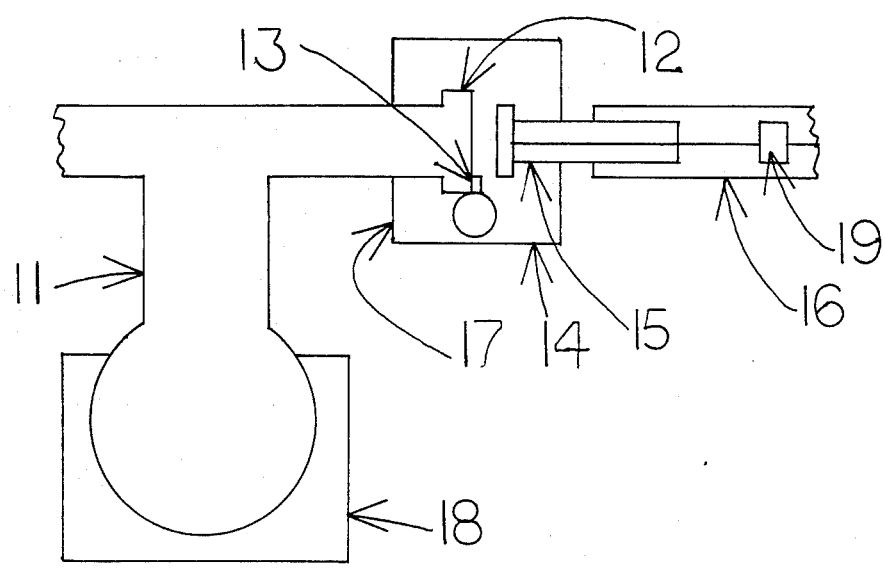
Figure 8:
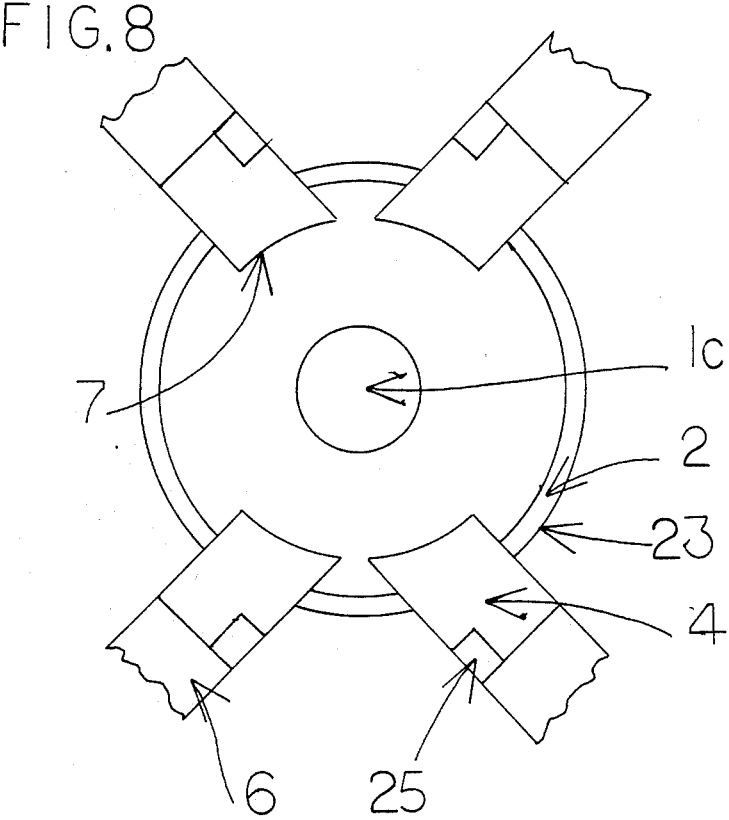

FIGS. 5A through 5C show side views of the rotor hub central axis, and the endwise view of an individual blade going through its various stages of changing pitch; also shown is the pivot point at one side of the blade which facilitates the coupling to another blades stationary pivot edge.

FIG. (6) Shows a breakdown of the mechanism of allowing the the independent moving of the blades around the perimeter of the rotor axis; and the means by which the blades are able to mesh up against one another to form one wing from two blades. Subdivision letter (A) is an edge view of the two blades meshed together to form a wing at an incline angle of attack. Sudivision (B) shows a top view of the blade wings intersection with the rotor axis which is partially shown. Subdivision (C) shows an endview of the independently movable retainer blocks, entrained within a circular track within the rotor hub; and the relative position of the individual blades in their meshed together state showing their common pivot point.

FIG. (7) Shows a cutaway side view of the rotor axis with relative position of blade and connective structure of blade to rotor hub.

FIG. (8) Shows a top view of the rotor axis with the four rotor blades radiating from its center; also shown are the angles of the blades relative to their necessity to oppose each other while spinning, and demonstrating the angle necessary to enable them to move up against their diagonal pair parallel for their mesh connection.

FIG. (9( Shows an endwise view of the common pivot hinge in alternative form.

FIG. (10) Shows an endwise view of the common pivot hinge in an alternative form.

DESCRIPTION OF THE PRESENTLY PREFERRED EMBODIMENT

An understanding of the present invention can best be gained by reference to FIG. (1) wherein an overall top view of the vehicle is shown, the transatmospheric space shuttle in being generally designated numeral 1 as stated previously the present invention space shuttle can be launched vertically, hover for definite periods in the lower atmosphere; and through the conversion from revolving rotor blades into stationary wing structures propelled by tail thrust engine. In this context, main body of the vehicle 1 acts as the base for the attachment of the revolving central rotor hubs 5, radiating from the rotor hubs are the joined together sets of diagonally opposed blades 6 and 7 in their swept back position. Reference numeral 3 designates aperture for thrust from foward propulsion engine 2. Reference numeral 4 is the control cockpit behind the heat resistant nose cone 8 utilized during reentry.

Figure 1:
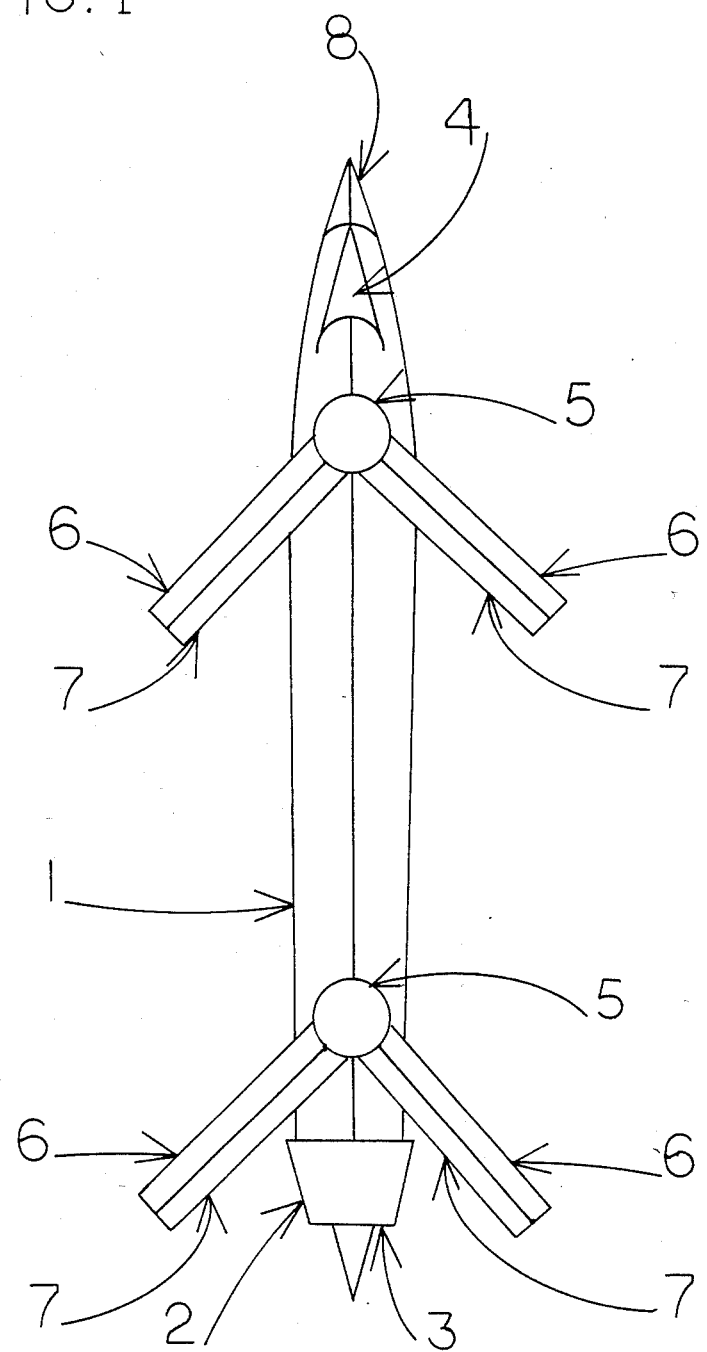
Figure 2:
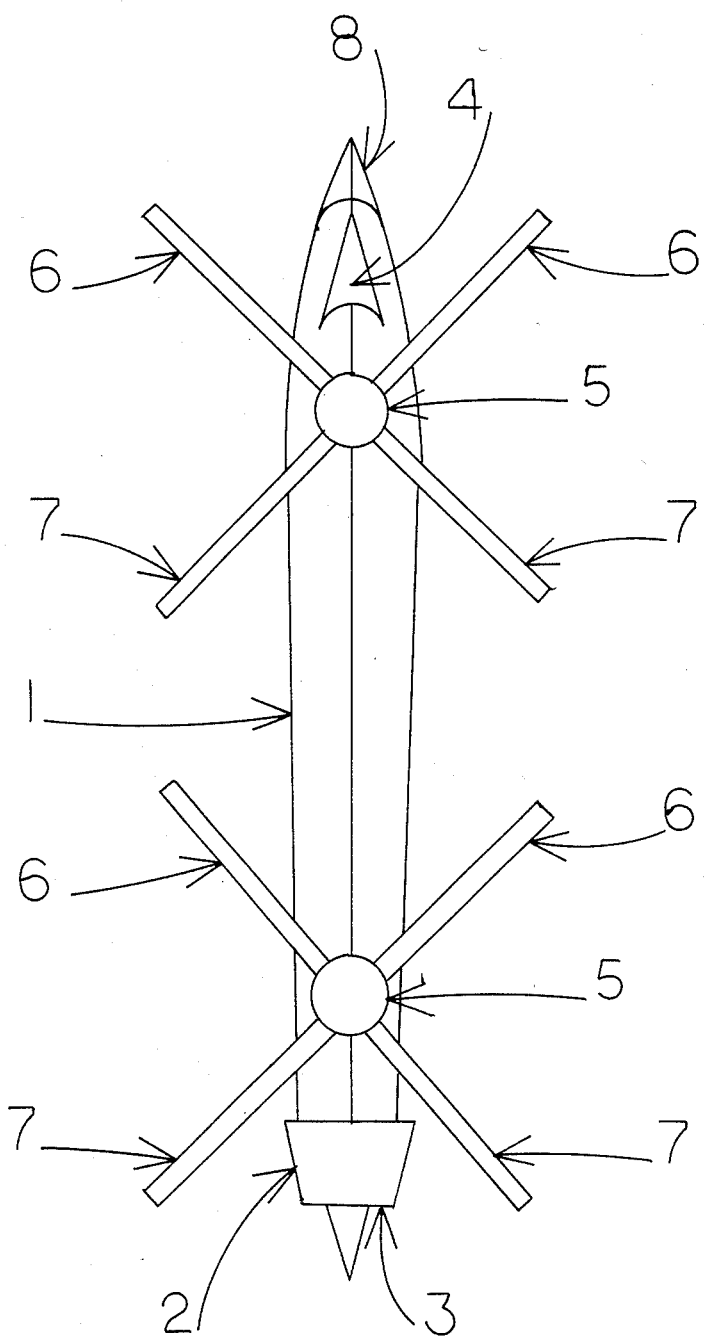
Figure 4A:
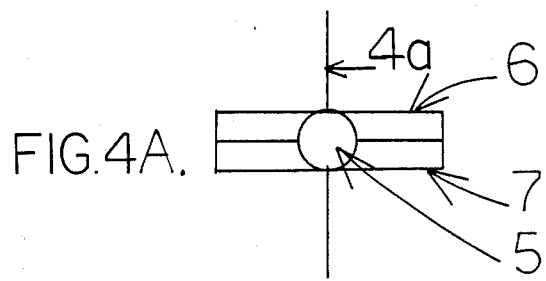
Figure 4B:
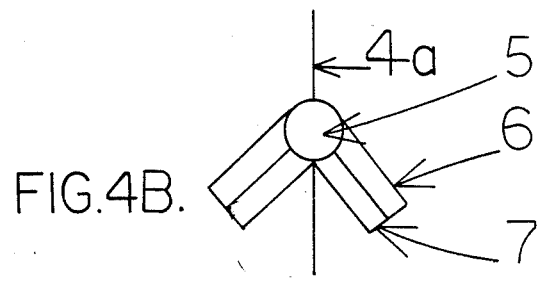
Figure 4C:
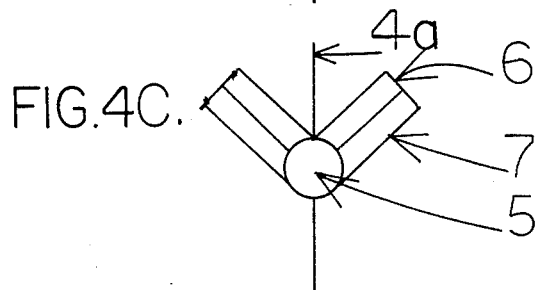
Figure 4D:
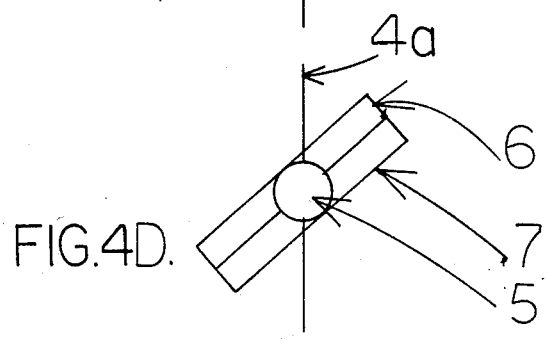
Figure 4E:
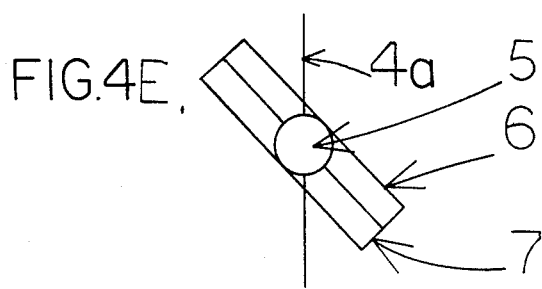

FIG. (2) shows position of the blades 6 and 7 after they come to a stop prior to the next phase of their positioning sequence. Reference numerals 1, 2, 3, 4, 5, and 8 are indicated in FIG. 1.

FIG. (3) shows opposing diagonal blades 6 and 7 in the phase where they mesh up against one another to form a single wing structure comprising variable pitch trailing flaps 7; and leading edges 6 also capable of changing their pitch. Both meshed together blades alter pitch by pivoting along the axis of their longitudinal intersection. Reference numerals 1, 2, 3, 4, 5, and 8 are indicated in FIG. 1.

FIG. (4) shows the variable configurations possible; subdivisions A, B, C, D, and E denote some of the infinite configurations possible where numeral 4a represents a centerline of reference as to the cylindrical axis of the vehicle body. Numeral 5 indicates the central rotor hub upon which all the blades are attached to centrally radiate from it, as shown the individual blades 6 and 7 are in their meshed together position forming variable pitch wings.

FIG. (5) shows the three phase depiction of the gradual change of angle of attack pitching of individual rotor blades, and is represented by subdivisions A, B, and C. Numeral 4 is a reference line to allow a determination of the change in pitch of the rotor blade numeral 2 which is attached to rotor hub 1a by way of pivot connector joint 3. Numeral 5 indicates the top of the rotor hub for perspective of view. Numeral 6a is the designate for mechanism's inside the rotor hub responsible for range of motion of the blade around the hub.

FIG. (6) subdivision A. shows numeral 11 circular areas which are motors responsible to change the angle of pitch of the blades. Numerals 2a and 3a are the pivot points of intersection of individual blades. Numerals 2a and 3a are the pivot points of intersection of individual blades meshing couplers as a cylinderical ball and socket. Numeral 4c designates blade halves in the edgewise cutaway view.

Subdivision B shows a top view of the combined blade wing; numerals 2a and 3a are the cylinder and trough socket that are utilized as pivot points along the length of the blades at intervals, also adding strenght to the independently movable blades. Numeral 11 represents the motors necessary for changing the pitch of the blades by causing the revolution of gear 1b upon partial radius gear surface 10. Numeral 8a is an indication of the motor responsible for movement of the individual blade around the perimeter of the hub 6b, trough guideway land 2a retains the movable blade carrier 5a on the rotor hub's radius as designated 2a and 6b.

Subdivision C shows an end view of the movable blade carrier 10, Numeral 16 indicates a gear, tracking upon the partial gear 10 to alter the pitch of the blades. Numeral 8a shows the motor responsible for the independent movement of the blades around the radius of the hub. Numerals 6c and 7c are internal pathways for the retaining lip edge of the rotor hub to restrain the movable wing carriers. Numeral 9 shows the shared pivot halves allowing parallel meshing of the blades into wings, these pivot shafts are forty five degress of radius allowing independent rotation within within their respective one hundred eighty degree half of the bearing sleeve they rotate in.

FIG. (7) is a crossestion down the axis of the rotor hub and rotor carrier, numeral 18 represents the area for the mechanisms of rotating the blades rotor shaft, and stopping its revolution by braking; also the alteration in the change of pitch of the rotor shaft, also to anchor the rotors to the vehicle, numeral 12 is the raised shoulder land or retainer flange around the perimeter of the hub to retain the blade carrier 14 upon it, gear 13 tracks upon the retainer flange 12 moving each blade independently around the perimeter of the hub. Numeral 15 is the shared pivot shaft that takes up only ninety degrees of one hundred eighty degree bearing half that it partially revolves within. Numeral 16 is the blade wing with the cylinder connector 19 that mates to its partner wing blade. Internal face of carrier is 17.

FIG. (8) shows a top view of the rotor hub with the individual blades radiating from it. Numeral 11 is the drive shaft for the rotor hub 23; numeral 12 is the raised flange land that retains the blade carrier 14 upon the hub. Numeral 16 is the blade wing top surface and 25 is the motorized gear section responsible for changing the pitch of the blades independent of each other. Numeral 17 shows the inside edge of the blade carrier and exemplifies the angle of the blade in relation to its position arrangement among the other the other blades during transition from stationary seperate independence from each other, to begin the phase of having the carriers swing the seperate blades together as reinforced wings capable of swing wing motion along the rotor track.

Referring to FIG. (9) where blade carrier blocks 32 join together at meeting face 35 to allow block 32 and partial sleeve shaft 33 to share the same radius in relation to a common center, numeral 34 designates empty space freeplay room for partial rotation of the latitude of sleeve shafts 3 to take place.

Referring to FIG. (10) where blade carrier blocks 32 join together at meeting face 43 to allow blocks 32 to lie in parallel to each other.

It should be understood that the invention is not limited to the particular embodiment shown and described herein but that various changes and modifications may be made without departing from the spirit or scope of this concept as defined by the following claims.

I claim:

1. Apparatus for use with a heavier than air machine lacking a fixed wing for providing vertical and horizontal takeoff and propulsion comprising, a fuselage, means for supporting a plurality of revolvable rotor blades including means to rotate said blades to obtain vertical takeoff and hovering without a fixed wing and means to pair and deploy said blades as a fixed wing suitable for horizontal takeoff and propulsion, each pair of said blades having one forwardly facing blade and one rearwardly facing blade, and means for changing the pitch of each of the forwardly and rearwardly facing blades independently of each other, said fuselage being provided with multiple spaced supporting means disposed along the length of said fuselage in lieu of a tail assembly.

2. The apparatus of claim 1 in which said pair and deploy means is capable of arranging said fixed wing in a swept back configuration.

3. The apparatus of claim 2 in which each blade includes motorized means for changing the pitch of its blade.

4. The apparatus of claim 1 wherein the plurality of revolvable rotor blades mounted on said supporting means are mounted in a single plane so that said blades rotate in unison.

* * * * *